B. O. BEADLE.
FASTENING.
APPLICATION FILED OCT. 13, 1919.

1,361,132.

Patented Dec. 7, 1920.

INVENTOR.
B. O. BEADLE

BY Earl N. Sinclair

ATTORNEY.

UNITED STATES PATENT OFFICE.

BAILEY O. BEADLE, OF ATLANTIC, IOWA.

FASTENING.

1,361,132.  Specification of Letters Patent.  Patented Dec. 7, 1920.

Application filed October 13, 1919. Serial No. 330,266.

*To all whom it may concern:*

Be it known that I, BAILEY O. BEADLE, a citizen of the United States of America, and resident of Atlantic, Cass County, Iowa, have invented a new and useful Fastening, of which the following is a specification.

The object of this invention is to provide an improved fastening particularly designed for use with non-skid devices.

A further object of the invention is to provide improved means to prevent lateral and limit longitudinal movement of mud lugs and other anti-skid devices on a wheel.

A further object of this invention is to provide a fastening for tire chains and mud lugs which shall be simple and cheap to make, easily mounted on the wheel, and one in which the operation of fastening and releasing the chain devices shall be facilitated, while providing positive and efficient means for holding the chains in place and for preventing undue movement of the non-skid devices.

A further object of this invention is to provide an improved fastening which may be mounted in one position on a wheel and employed for securing endless non-skid devices and in another position on the wheel for securing individual mud lugs, or anti-slipping devices of the single unit type.

My invention consists in the construction, arrangement and combination of elements hereinafter set forth, pointed out in my claims and illustrated by the accompanying drawing, in which—

Figure 1:
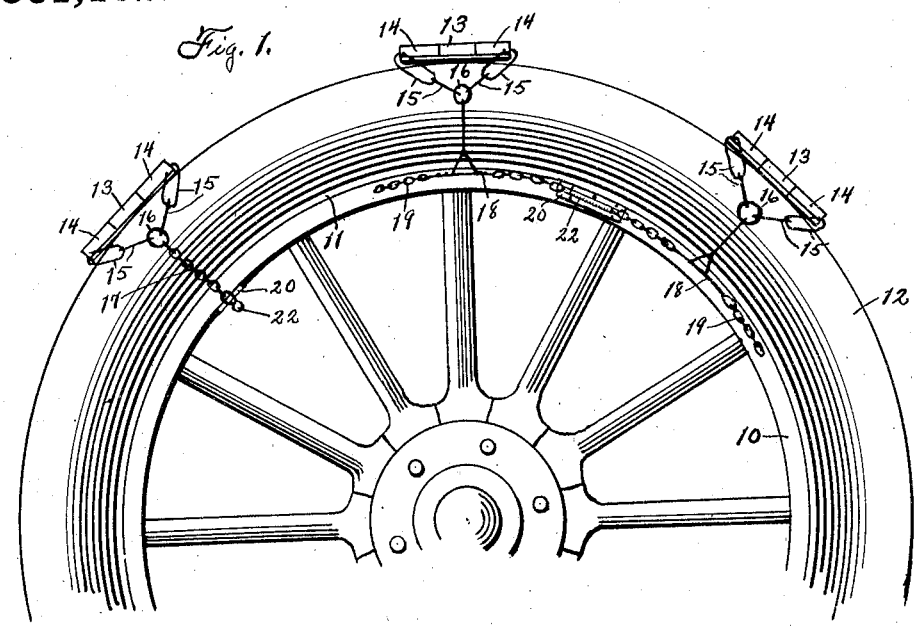
Figure 2:
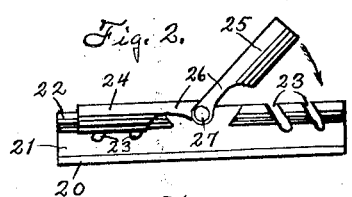
Figure 4:
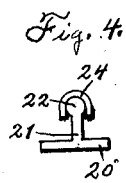
Figure 3:
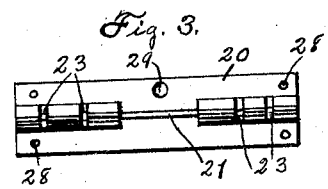
Figure 6:
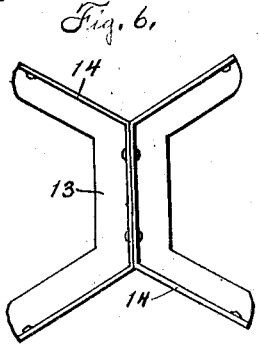
Figure 5:
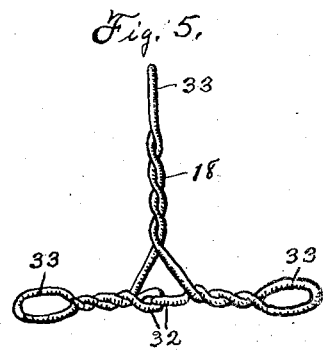

Figure 1 is a side elevation of a portion of a vehicle wheel and tire, illustrating my improved fastening thereon in position for securing both the endless chain and the single unit type of anti-skid devices. Figs. 2, 3 and 4 are side elevation, plan and end elevation, respectively, of the fastening detached, the keepers being omitted in Fig. 3. Fig. 5 is an elevation illustrating a special form of link which may be used with my anti-skid devices. Fig. 6 is a plan of the mud lug detached.

In the accompanying drawing, the numeral 10 designates generally a vehicle wheel felly which carries a suitable rim 11 and tire 12, which may be either the solid or pneumatic type. On the tire 12 are adapted to be mounted a plurality of mud lugs 13, either singly as shown on the left hand side in Fig. 1, or in connected groups as shown at the right thereof.

The mud lug or anti-slipping member here shown, and which I prefer to use, is illustrated, described and claimed in Letters Patent of the United States Number 1,301,535 granted to me April 22, 1919, to which reference hereby is made. The body thereof extends longitudinally of the tire 12 and has at each end a V-shaped extension 14, the body and each of said extensions having outwardly extending flanges or ribs adapted to grip the tread surface, increase the traction and prevent slipping, especially lateral slipping. Chain links 15 are pivoted to each end or terminal of each V-shaped extension 14, and on each side of the lug and tire said chains are connected to each other by a common link 16. Means is provided, connected to each of the common or central links 16, for connecting the anti-skid device to the tire and wheel. Where the individual or single unit devices are employed, this connecting means may be a chain section 17, and where the connected or continuous form is employed, the connecting means may be a special link 18, shown in detail in Fig. 5. In either instance the connecting means extends laterally across the sides of the tire and toward the felly 10. Where the special link 18 is used as a connecting means, it is connected to side chains 19 of common form, extending circumferentially at each side of the tire, and provides a relatively long and rigid means for preventing undue side motion of the anti-skid member.

The fastening device proper is relatively long and narrow and comprises a base 20, a web portion 21 extending centrally and longitudinally on one face of the base, and a head portion 22 on the outer margin of said web, said members being formed integrally by molding or pressing and stamping. The head portion 22 is expanded laterally relative to the web and preferably is substantially circular in cross-section. On each side of the center of the fastening device arc formed one or more slots 23, in this instance two in number on each end, said slots extending through the head 22 and into the web 21 and being inclined from the center of the device toward each end thereof. Keepers 24, 25 are provided, each formed with a forked end 26 straddling and pivoted to the central portion of the web 21 by means of a common rivet 27. The free end portions of the keepers 24, 25 are expanded and are concavo-convex in cross-section and adapted to fit over the head 22, preferably being formed of spring metal adapted to frictionally engage said head in order to prevent accidental removal therefrom when in position. When closed the concavo-convex portions of the keepers cover the outer open ends of the slots 23 and prevent removal of chain devices therefrom.

When employed with the single unit antiskid devices as shown at the left of Fig. 1 the fastening device is mounted transversely of the radially inner side of the felly and secured by means of lag screws passing through holes 28 formed in the base 20 on each side and near each end. One of the fastening devices is employed for each separate anti-skid device or mud lug, and the chain section 17 on each side is carried around the tire, rim and felly and engaged, by one of its links, in one or another of the slots 23 at the adjacent end of the fastener. The keepers 24, 25 are then closed, springing over the head 22, and retain the connecting members in place. The slots 23 extend into the web portion 21 sufficiently to provide space for the chains 17 to rest in such portion when the keepers are closed. The connecting members 17 are drawn sufficiently taut to prevent undue longitudinal or lateral movement of the lugs 13 relative to the tire, and yet so that the lugs do not always rest in the same place on the tire, thus preventing excessive wear and bringing out the greatest efficiency of the antiskidding devices. It is obvious that as many of the separate anti-skid devices may be employed as desired, the fastening devices being placed in spaced relation on the felly as desired and the mud lugs secured thereto when needed, especially for emergency purposes in extricating the vehicle from mud holes.

When the continuous form of anti-skid devices are employed for general purposes, as illustrated at the right of Fig. 1, two only of the fastening members are used, one on each side of the felly and directly opposite each other. The fastening devices are in this instance arranged longitudinally and secured to the lateral sides of the felly, by means of lag screws 30 through the holes 28. I prefer, however, to provide a hole 29 through the central portion of the base 20, on at least one side, so that a bolt such as 31 may be passed entirely through the felly and through the hole 29 of each fastener. This bolt is used only on the side of the fastener nearest the hub of the wheel, while the lag screws are used on the side nearest the tire. End portions of the side chains 19, are secured, by means of terminal or other links, in the slots 23 at each end of each fastening device, thus not only securing the ends of the continuous side chains but also preventing undue longitudinal movement of the anti-skidding devices, while excessive side motion is prevented by the relatively rigid links 18. The keepers 24, 25 are of course closed as previously indicated, to retain the chains in place.

The special link 18 is of generally T-shape and is preferably formed of a single length of wire, double throughout and twisted upon itself and connected by interengaging hooks 32 at the head of the T. At each terminal an eye 33 is formed by omitting the twists and expanding the doubled wire, and said eyes providing means for receiving connection of chain or link members. The eye 33 at the end of the stem is secured to the common central link 16 of the mud lugs, while the eyes at each end of the head of the T are secured to links of the chains 19.

I do not desire to be understood as limiting myself to the precise construction and arrangement of elements herein set forth, as various modifications may be employed, within the scope of the appended claims, without departing from the spirit of my invention.

I claim as my invention—

1. A fastening for anti-skid devices, comprising a base and an outwardly extending member integral therewith and formed with inclined slots adapted to receive chain links, and a keeper pivoted to said outwardly extending member and adapted to frictionally engage the same and cover said slots.

2. A fastening, comprising a base and an outwardly extending member integral therewith and formed with inclined slots near each end, and keepers pivoted at one end each on said outwardly extending member and adapted to cover and close said slots.

3. A fastening, comprising a base, a web and an expanded head on the outer margin of said web, inclined slots being formed passing through said head and into said web, and a keeper formed at one end and straddling said head and web and pivoted to the latter, said keeper having its other end fitted to and adapted to frictionally engage said head and cover said slots.

4. A fastening, comprising a base, a web centrally thereof, a head on the outer margin of said web, inclined slots being formed at each end of the device passing through said head and into said web, and keepers pivoted each at one end to the central portion of the web and adapted to engage said head and close the slots, together with means for securing said base to a felly.

5. A fastening for anti-skid devices, comprising a base, a web centrally of one side thereof, a head on the outer margin of said web, inclined slots being formed at each end of the device passing through said head and into said web, and keepers pivoted each at one end to the central portion of the web and adapted to engage said head and cover said slots, together with means for securing said base to a wheel felly either transversely or circumferentially thereof.

Signed at Des Moines, in the county of Polk and State of Iowa, this 30th day of August, 1919.

BAILEY O. BEADLE.